(12) United States Patent
Jiang et al.

(10) Patent No.: US 9,922,228 B2
(45) Date of Patent: Mar. 20, 2018

(54) METHOD AND APPARATUS FOR FINGERPRINT RECOGNITION AND MOBILE TERMINAL

(71) Applicant: Xiaomi Inc., Beijing (CN)

(72) Inventors: Zhongsheng Jiang, Beijing (CN); Kun Yang, Beijing (CN); Dan Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 124 days.

(21) Appl. No.: 15/207,576

(22) Filed: Jul. 12, 2016

(65) Prior Publication Data

US 2017/0061192 A1     Mar. 2, 2017

(30) Foreign Application Priority Data

Sep. 2, 2015 (CN) .......................... 2015 1 0556759

(51) Int. Cl.
*G06K 9/00* (2006.01)
*G06F 21/32* (2013.01)
(Continued)

(52) U.S. Cl.
CPC ..... *G06K 9/00013* (2013.01); *G06F 3/04886* (2013.01); *G06F 21/32* (2013.01);
(Continued)

(58) Field of Classification Search
CPC ........... G06K 9/00013; G06K 9/00067; G06F 3/04886; G06F 21/32; H02J 7/0045; H02J 2007/0096
See application file for complete search history.

(56) References Cited

U.S. PATENT DOCUMENTS 6,323,846 B1 * 11/2001 Westerman ........... G06F 3/0235
345/173
2002/0077079 A1    6/2002 Ishihara
(Continued)

FOREIGN PATENT DOCUMENTS

| CN | 101079102 A | 11/2007 |
|---|---|---|
| CN | 101313562 A | 11/2008 |
| CN | 101609499 A | 12/2009 |
| CN | 104794433 A | 7/2015 |

(Continued)

OTHER PUBLICATIONS

English Translation of International Search Report dated Mar. 25, 2016 for International Application No. PCT/CN2015/098856, 6 pages.

(Continued)

*Primary Examiner* — Samir Ahmed
(74) *Attorney, Agent, or Firm* — Brinks, Gilson & Lione

(57) ABSTRACT

A method for fingerprint recognition may include: acquiring a current charging state of the mobile terminal; updating setting of a fingerprint recognition threshold value according to the current charging state of the mobile terminal; acquiring a fingerprint image, and extracting feature information of the fingerprint image; and conducting a fingerprint recognition according to the extracted feature information and the fingerprint recognition threshold value. In embodiments of the present disclosure, the current charging state of the mobile terminal is acquired and setting of the fingerprint recognition threshold value is thus updated according to the current charging state of the mobile terminal, such that the mobile terminal can acquire the same fingerprint recognition rate regardless of different charging states.

20 Claims, 7 Drawing Sheets

(51) Int. Cl.
*G06F 3/0488* (2013.01)
*H02J 7/00* (2006.01)

(52) U.S. Cl.
CPC ........ *G06K 9/00067* (2013.01); *H02J 7/0045* (2013.01); *H02J 2007/0096* (2013.01)

(56) References Cited

U.S. PATENT DOCUMENTS

| | | |
|---|---|---|
| 2015/0192440 A1 | 7/2015 | Chow et al. |
| 2015/0243157 A1* | 8/2015 | Choi ................... E05B 73/0005 340/571 |
| 2015/0302568 A1* | 10/2015 | Hirai ................... G01N 23/2254 382/149 |
| 2017/0262690 A1* | 9/2017 | Zhang ................ G06K 9/00013 |

FOREIGN PATENT DOCUMENTS

| | | |
|---|---|---|
| CN | 105160320 A | 12/2015 |
| EP | 0 508 845 A2 | 10/1992 |
| JP | 2001-202513 A | 7/2001 |
| JP | 2005-292873 A | 10/2005 |
| JP | 2008-171238 A | 7/2008 |
| JP | 2012-063889 A | 3/2012 |
| RU | 2012 123 972 A | 12/2013 |
| WO | WO 2007/060178 A1 | 5/2007 |

OTHER PUBLICATIONS

Notice of Allowance dated Oct. 3, 2017 for Japanese Application No. 2017-537003, 3 pages.
Office Action dated Sep. 13, 2017 for Russian Application No. 2016122618/08, 11 pages.

* cited by examiner

METHOD AND APPARATUS FOR FINGERPRINT RECOGNITION AND MOBILE TERMINAL

CROSS-REFERENCE TO RELATED APPLICATION

This application is based on and claims priority to Chinese Patent Application No. 201510556759.2, filed on Sep. 2, 2015, the entire content of which is incorporated herein by reference.

TECHNICAL FIELD

The present disclosure generally relates to the field of the mobile terminal technology, and more particularly, to a method and an apparatus for fingerprint recognition and a mobile terminal implementing the method.

BACKGROUND

With the rapid development of the mobile terminal technology, various mobile terminals such as mobile phones are widely used. Functions of the mobile terminals are constantly increased, and these new functions bring many conveniences to users, and thus are well received by users. For example, an existing mobile phone has a fingerprint recognition virtual key, and a user may make fingerprint recognition by touching the virtual key.

At present, the fingerprint recognition virtual key is configured in such a way that a fingerprint recognition sensor is disposed beneath a glass cover-plate, and the fingerprint recognition sensor recognizes a fingerprint when the user's finger touches the area that the fingerprint recognition sensor locates. However, the fingerprint recognition sensor has different sensitivity in different cases; for example, a noise signal of a mobile phone in different charging states may affect a signal of the fingerprint recognition sensor in recognizing the finger. Therefore, when a finger touches the fingerprint recognition virtual key at different instances, the fingerprint recognition sensor may acquire different fingerprint signals. However, since the fingerprint recognition generally adopts a fixed threshold value, a fingerprint recognition circuit may have unstable fingerprint recognition rates.

SUMMARY

The present disclosure provides a method and an apparatus for fingerprint recognition and a mobile terminal.

According to an aspect of the present disclosure, an electronic device may comprise a sensor to scan an image from an image recognition area; a non-transitory storage medium comprising a set of instructions for image recognition; and a processor in communication with the storage medium. When executing the set of instructions, the processor is directed to: obtain a current charging state of the electronic device; determine a current image recognition threshold value according to the current charging state; obtain a target image from the sensor; extract feature information associated with the target image; and perform image recognition according to the feature information and the current image recognition threshold value.

According to another aspect of the present disclosure, a method for image recognition may comprise: obtaining, by a mobile terminal, a current charging state of the mobile terminal; determining, by the mobile terminal, a current image recognition threshold value according to the current charging state; obtaining, by the mobile terminal, a target image from a sensor of the mobile terminal; extracting, by the mobile terminal, feature information associated with the target image; and performing, by the mobile terminal, image recognition according to the feature information and the current image recognition threshold value.

According to another aspect of the present disclosure, a mobile phone may comprise: a power management unit (PMU) to obtain a hardware interrupt signal; and an image recognition integrated circuit to, obtain the hardware interrupt signal from the PMU, obtain a current charging state of the mobile phone according to the hardware interrupt signal, determine a fingerprint recognition threshold value according to the current charging state; obtain a fingerprint image from a sensor of the mobile phone; extract feature information of the fingerprint image; and perform fingerprint recognition according to the feature information and the fingerprint recognition threshold value.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 10:
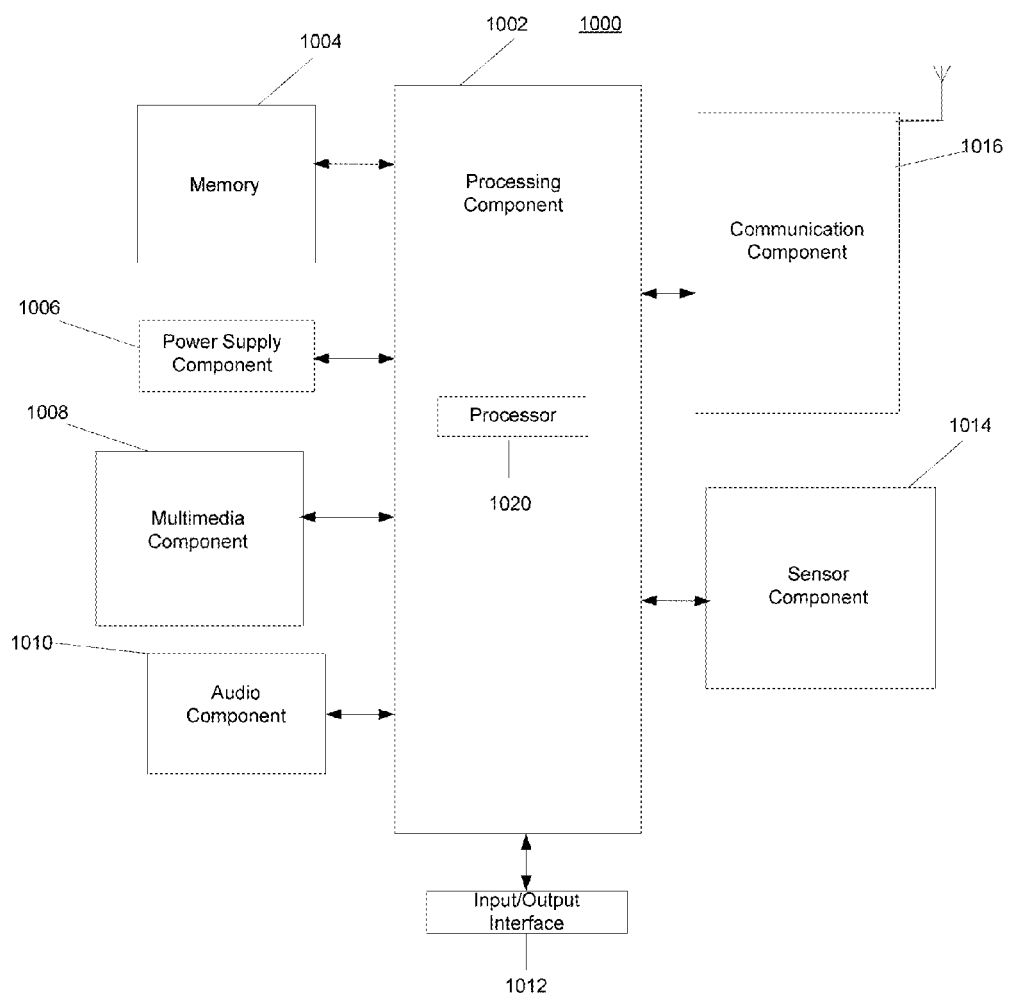
FIG. 10 is a block diagram illustrating an applicable apparatus for fingerprint recognition according to an exemplary embodiment.

FIG. 10 is a block diagram applicable to a device for fingerprint recognition according to an exemplary embodiment. For example, the apparatus 1000 may be a mobile telephone, a computer, a digital broadcasting terminal, a message transceiver device, a games console, a tablet device, a medical device, a fitness facility, a personal digital assistant, an aircraft and the like.

Referring to FIG. 10, the apparatus 1000 may include one or more components as below: a processing component 1002, a memory 1004, a power supply component 1006, a multimedia component 1008, an audio component 1010, an input/output (I/O) interface 1012, a sensor component 1014 and a communications component 1016.

The processing component 1002 generally controls the overall operation of the apparatus 1000, for example, display, telephone call, data communications, and operation associated with camera operation and record operation. The processing component 1002 may include one or more processors 1020 for executing instructions so as to complete steps of the foregoing method in part or in whole. In addition, the processing component 1002 may include one or more modules for the convenience of interaction between the processing component 1002 and other components. For example, the processing component 1002 may include a multimedia module for the convenience of interaction between the multimedia component 1008 and the processing component 1002.

The memory 1004 is configured to store various types of data so as to support the operation of the apparatus 1000. Examples of the data include instructions of any application program or method operated on the apparatus 1000, contact data, phonebook data, a message, a picture and a video, etc. The memory 1004 may be implemented by any type of volatile or non-volatile memory device or combination thereof, for example, a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk or an optical disk.

The power supply component 1006 provides power for various components of the apparatus 1000. The power supply component 1006 may include a power management system, one or more power supplies, and other components associated with generation, management and power distribution of the apparatus 1000.

The multimedia component 1008 may include a screen between the apparatus 1000 and a user for providing an output interface. In some embodiments, the screen may include a liquid crystal display (LCD) and a touch panel (TP). If the screen includes a touch panel, the screen may be implemented as a touch screen for receiving an input signal from the user. The touch panel may include one or more touch sensors for sensing touching, sliding and gestures on the touch panel. The touch sensor not only can sensor trip boundary of touching or sliding, but also can detect the time duration and pressure related to the touching or sliding operation. In some embodiments, the multimedia component 1008 may include a front-facing camera and/or a rear-facing camera. When the apparatus 1000 is in an operation mode, for example, a capture mode or a video mode, the front-facing camera and/or the rear-facing camera may receive external multimedia data. Each front-facing camera and rear-facing camera may be a fixed optical lens system or have a focal length and optical zoom capacity.

The audio component 1010 is configured to output and/or input an audio signal. For example, the audio component 1010 may include a microphone (MIC); when the apparatus 1000 is in an operation mode such as a call mode, a record mode and a speech recognition mode, the microphone is configured to receive an external audio signal. The received audio signal may be further stored in the memory 1004 or sent out by the communications component 1016. In some embodiments, the audio component 1010 also may include a loudspeaker for outputting an audio signal.

The I/O interface 1012 provides an interface for the processor component 1002 and peripheral interface modules, the peripheral interface modules may be a keyboard, a click wheel and buttons, etc. These buttons may include but are not limited to: a home button, a volume button, a start button and a lock button.

The sensor component 1014 may include one or more sensors to support a plurality of status evaluations of the apparatus 1000. For example, the sensor component 1014 may include a fingerprint recognition sensor, which locates under a fingerprint recognition area on the screen of the multimedia component 1008. The fingerprint recognition sensor may be a capacity sensor, ultrasonic sensor, and/or optical sensor to sensor the ridges and valleys of one's fingerprint. When the mobile terminal detects a user's fingerprint, the mobile terminal may activate the fingerprint recognition sensor and display a virtual key for fingerprint recognition on the fingerprint recognition area. The virtual key may be an icon to identify the fingerprint recognition area so that the user knows where to place his/her finger on. When the user touches the virtual key, the fingerprint recognition sensor may collect the fingerprint information from the fingerprint recognition area. Further, the mobile terminal may also include a fingerprint recognition integrate circuit, which is connected to the sensor to receive signals detected thereby.

Additionally, the sensor component 1014 may also include sensors to detect the on/off state of the apparatus 1000, relative positioning of components, for example, the components are the displayer and keypads of the apparatus 1000. The sensor component 1014 may also include sensors to detect the position change of the apparatus 1000 or a component thereof, the presence or absence of users' touch on the apparatus 1000, the direction or acceleration/deceleration of the apparatus 1000, and temperature variation of the apparatus 1000. The sensor component 1014 may also include a proximity detector, which is configured to detect the presence of a nearby object in case of no physical contact. The sensor component 1014 may also include an optical sensor, for example, a CMO or CCD image sensor, used in the application of imaging. In some embodiments, the sensor component 1014 may also include an acceleration sensor, a gyro sensor, a magnetic sensor, a pressure sensor, or a temperature sensor.

The communications component 1016 is configured to facilitate wired communications or wireless communications between the apparatus 1000 and other devices. The apparatus 1000 is available for access to a wireless network based on communications standards, for example, Wi-Fi, 2G or 3G, or a combination thereof. In an exemplary embodiment, the communications component 1016 receives, by means of a broadcast channel, a broadcast signal or broadcast-related information from an external broadcast management system. In an exemplary embodiment, the communications component 1016 also may include a near field communication (NFC) module to promote short-range communications. For example, the NFC module may be implemented on the basis of Radio Frequency Identification (RFID) Technology, Infrared Data Association (IrDA) Technology, Ultra-wide Bandwidth (UWB) Technology, Bluetooth (BT) Technology and other technologies.

In an exemplary embodiment, the apparatus 1000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components to execute the foregoing method.

In an exemplary embodiment, a non-transitory computer-readable storage medium including an instruction is also provided, for example, a memory 1004 including the instruction, the foregoing instruction may be executed by the processor 1020 of the apparatus 1000 to achieve the foregoing method. For example, the non-transitory computer-readable storage medium may be a ROM, a random access memory (RAM), a CD-ROM, a magnetic tape, a floppy disk and an optical data storage device, etc.

Figure 1:
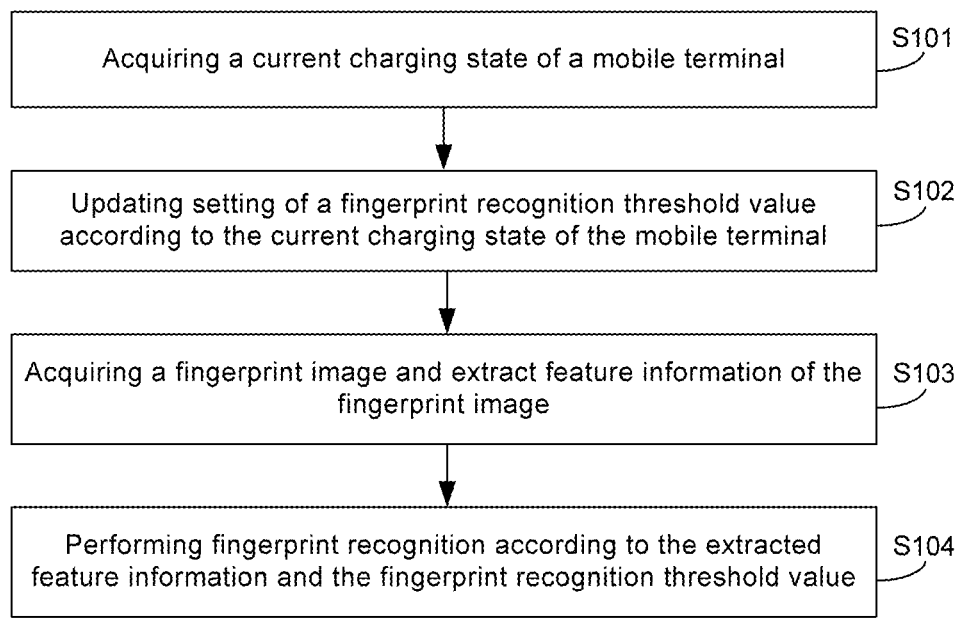
FIG. 1 is a flowchart illustrating a method for fingerprint recognition according to an exemplary embodiment.

FIG. 1 is a flowchart illustrating a method for fingerprint recognition according to an exemplary embodiment. As shown in FIG. 1, the method for fingerprint recognition may be applied to a mobile terminal including but not limited to a mobile phone, a tablet computer (PAD) or the like, such as the apparatus 1000 in FIG. 10. For example, the method may be implemented as an application or a set of instructions stored in the non-transitory storage medium of the mobile terminal. A processor of the mobile terminal may communicate with the storage medium and execute the set of instructions to perform steps in the method. The method for fingerprint recognition may include the following steps S101-S104.

In Step S101, obtaining a grounding state (e.g., a current charging state) of the mobile terminal.

The grounding state of the mobile terminal may be measured by various ways. For example, it may be measured by whether the mobile terminal is connected to a charger. The grounding state may affect whether there is a capacitance between the mobile terminal and the ground. For example, if the mobile terminal is connected to a charger (e.g., connected to a power bank via a USB or directly to a charger), the mobile terminal may be connected to the ground, thereby has zero electric potential from the ground; but if the mobile terminal is not connected to a charger, the mobile terminal may form a capacitor with the ground. The capacitance between the mobile terminal and ground may affect the accuracy of the fingerprint recognition. Therefore, by obtaining the grounding state (e.g., the current charging state), the mobile terminal may be able to estimate the disturbance or error of its fingerprint recognition performance. For illustration purpose, the embodiments of present application use the charging state of the mobile terminal as an example to determine the grounding state thereof. Accordingly, the charging state of the mobile terminal may include charging via a USB port, charging via a socket power supply, and/or not being charged.

In this embodiment, the mobile terminal may be connected to a charger via a data line, so that the charger may provide a power supply for the mobile terminal. The charger may be a transformer connected to an AC connector. Alternatively, the charger may be a portable power charger or power bank; or the mobile terminal may be connected to a device such as a computer via a data line for data transmission.

The current charging state of the mobile terminal may refer to: a state of the mobile terminal being connected to the charger via a data line, or a state of the mobile terminal being connected to a device such as a computer via a data line.

The method for acquiring the current charging state of the mobile terminal may include but is not limited to the following manner.

In the first manner, the mobile terminal may receive the current charging state obtained by an operation system of the mobile terminal.

In the second manner, the mobile terminal may receive, obtains, and/or acquires a hardware interrupt signal from a power management unit (PMU) of the mobile terminal, and then determine the current charging state based on the hardware interrupt signal.

The PMU of the mobile terminal may be activated to obtain the current charging state of the mobile terminal every time when it determines that the mobile terminal is connected with a USB port or a charger.

In Step S102, updating a fingerprint recognition threshold value according to the current charging state of the mobile terminal.

When the mobile terminal is not in the charging state (i.e., not connected to the ground), the noise of fingerprint recognition signal may be higher than the charging state (i.e., when the mobile terminal is grounded). Consequently, the fingerprint recognition accuracy under the charging state is higher than the non-charging state. Therefore, the mobile terminal may offset the difference of fingerprint recognition accuracy via adjusting system parameters, such as adjusting signal gain or filter sensitivity via hardware or software parameter adjustment.

To this end, the mobile terminal may obtain a constant value of recognition rate of the fingerprint recognition sensor. This recognition rate may be predetermined and saved in the mobile terminal. Alternatively, the mobile terminal may determine this rate based on its previous status. For example, the mobile terminal may first obtain a previously determined fingerprint recognition threshold value. The previously determined fingerprint recognition threshold may correspond to a previously measured charging state of the mobile terminal. The mobile terminal may determine the recognition rate of the fingerprint recognition sensor based thereon. This rate equals or substantially equals the predetermined recognition rate.

Sensitivity of the fingerprint recognition sensor changes based on the charging state of the mobile terminal. Thus after the current charging state of the mobile terminal is changed, the sensitivity of the fingerprint recognition sensor is changed. Therefore, after determining and/or obtaining the current charge status, the mobile terminal may update the fingerprint recognition threshold value according to the current charging state, so as to offset and/or counteract the fingerprint recognition rate caused by a drift of the sensitivity. As a result, the mobile terminal may achieve a stable fingerprint recognition rate, i.e., maintaining the fingerprint recognition rate under current charging state the same and/or substantially the same as the previous charging state. For example, when the mobile terminal is not being charged (or not grounded), signal from a capacitive finger print sensor based on measuring either electric charge under preset voltage or voltage under preset electric charge in the presence of a finger may be noisier. Thus, the number of recognized minutiae features (see below) may be fewer than that recognized when the mobile terminal is being charged, leading to decrease in fingerprint recognition rate. To counter this decrease, the fingerprint recognition threshold, e.g., the number of minutiae features, may be decreased such that the fingerprint recognition rate is maintained. For example, the fingerprint recognition threshold may be 10 and 8 matching minutiae features for a successful fingerprint recognition when the mobile terminal is not being charged and being charged, respectively. Alternatively, the number of matching minutiae features may be maintained the same but the decrease of fingerprint recognition threshold may be realized by adjusting the degree of matching as to each minutiae feature. For example, a minutiae feature such as a distance between two fingerprint ridges may be considered a match if it is within 5% and 10% difference from the value stored in a database of a set of fingerprint features when the mobile terminal is in a charging state and non-charging state, respectively.

The mobile terminal may update the setting of the fingerprint recognition threshold value every time when it receives the charging state of the mobile terminal.

In Step S103, obtaining a fingerprint image, and extracting feature information of the fingerprint image.

In this embodiment, the mobile terminal may include the fingerprint recognition area on its touch screen under which a finger recognition sensor is located. The mobile terminal may display a virtual key for fingerprint recognition on the fingerprint recognition area. Further, the mobile terminal may also include a fingerprint recognition integrate circuit, which is connected to the sensor to receive signals detected thereby. When a user instructs the mobile terminal to recognize him/her by his/her finger print, the mobile terminal may display the virtual key on the fingerprint recognition area of its touch screen. As the user touches his/her finger on the fingerprint recognition area, the processor of the mobile terminal may direct the fingerprint recognition sensor beneath the area to scan and obtain a current image of the user's fingerprint. The processor of the mobile terminal then may direct the fingerprint recognition IC to obtain and/or receive, the current fingerprint image from the fingerprint recognition sensor, and extract feature information of the current fingerprint image. The extracted feature information may include but is not limited to minutiae features of fingerprint ridges such as ridge ending, bifurcation, and short ridge. For example, a ridge ending is the point at which a fingerprint ridge terminates. Bifurcations are points where a single ridge splits into two ridges. Short ridges are the fingerprint ridges that are significantly shorter than average fingerprint ridges.

It is to be noted that there is no limitation on execution order between Step S103 and Steps S101-102.

In Step S104, conducting fingerprint recognition according to the extracted feature information and the fingerprint recognition threshold value.

Before conducting the fingerprint recognition, the user may operate the mobile terminal to scan his/her fingerprint and thereby input a reference fingerprint image into the mobile terminal. The mobile terminal may analyze the image and extract therefrom reference features. Then the mobile terminal may store the reference features as a verification feature.

Later on, when the user scan his/her fingerprint to login the mobile terminal or to conduct other operations that needs to verify the user's identity, the mobile terminal may compare the extracted feature information of the current fingerprint image with the prestored verification feature. For example, the mobile terminal may determine similarity of the current fingerprint image feature information with the verification feature. The mobile terminal may determine that the fingerprint recognition is successful if a comparison result reaches the fingerprint recognition threshold value (e.g., a value of the similarity is greater than the fingerprint recognition threshold value); and the mobile terminal may determine that the fingerprint recognition is failed if the comparison result does not reach the fingerprint recognition threshold value (e.g., the value of the similarity is less than the fingerprint recognition threshold value). When the similarity is equal to the fingerprint recognition threshold value, the mobile terminal may either determine that the fingerprint recognition succeeds or fails, depending in predetermined system settings.

In the embodiments of the foregoing method for fingerprint recognition, the current charging state of the mobile terminal is acquired and setting of the fingerprint recognition threshold value is updated according to the current charging state of the mobile terminal, such that the mobile terminal can achieve the same fingerprint recognition rate in different charging states.

Figure 2A:
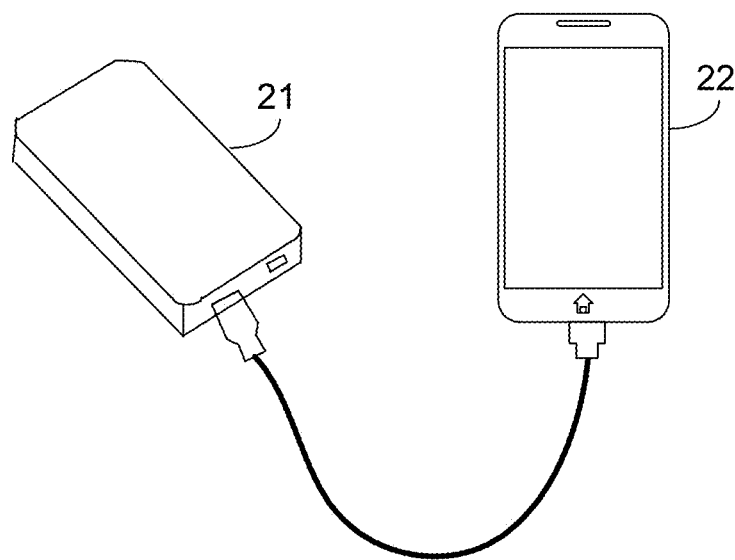
FIG. 2a illustrates an application scenario of a method for fingerprint recognition according to an exemplary embodiment.
Figure 2B:
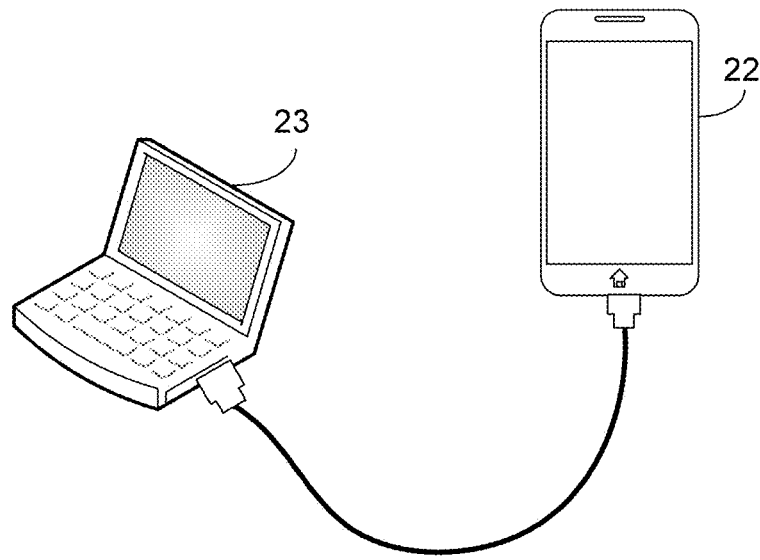
FIG. 2b illustrates an application scenario of a method for fingerprint recognition according to an exemplary embodiment.

The following makes an exemplary description of the present disclosure with reference to FIG. 2a and FIG. 2b. As shown in FIG. 2a, when the user uses a portable power charger 21 to charge a mobile phone 22, the mobile phone 22 may acquire the current charging state, and update the setting of the fingerprint recognition threshold value according to the current charging state. Then, when the user touches the fingerprint recognition virtual key on the mobile phone 22, the fingerprint recognition integrated circuit of the mobile terminal may acquire the user's current fingerprint image from the fingerprint recognition sensor, and extract the feature information of the current fingerprint image, and finally enable the fingerprint recognition according to the feature information of the current fingerprint image and the current fingerprint recognition threshold value. As shown in FIG. 2b, when the user connects the mobile phone 22 to a notebook computer 23 via a USB data line, the mobile phone 22 may acquire the current charging state, and update the setting of the fingerprint recognition threshold value according to the current charging state. Then, when the user touches the fingerprint recognition virtual key on the mobile phone 22, the fingerprint recognition integrated circuit of the mobile terminal may acquire the user's current fingerprint image from the fingerprint recognition sensor, and extract the feature information of the current fingerprint image, and finally enable fingerprint recognition according to the feature information of the current fingerprint image and the current fingerprint recognition threshold value. Although two different charging states are shown in FIG. 2a and FIG. 2b, the same fingerprint recognition success rate can be achieved.

Figure 3:
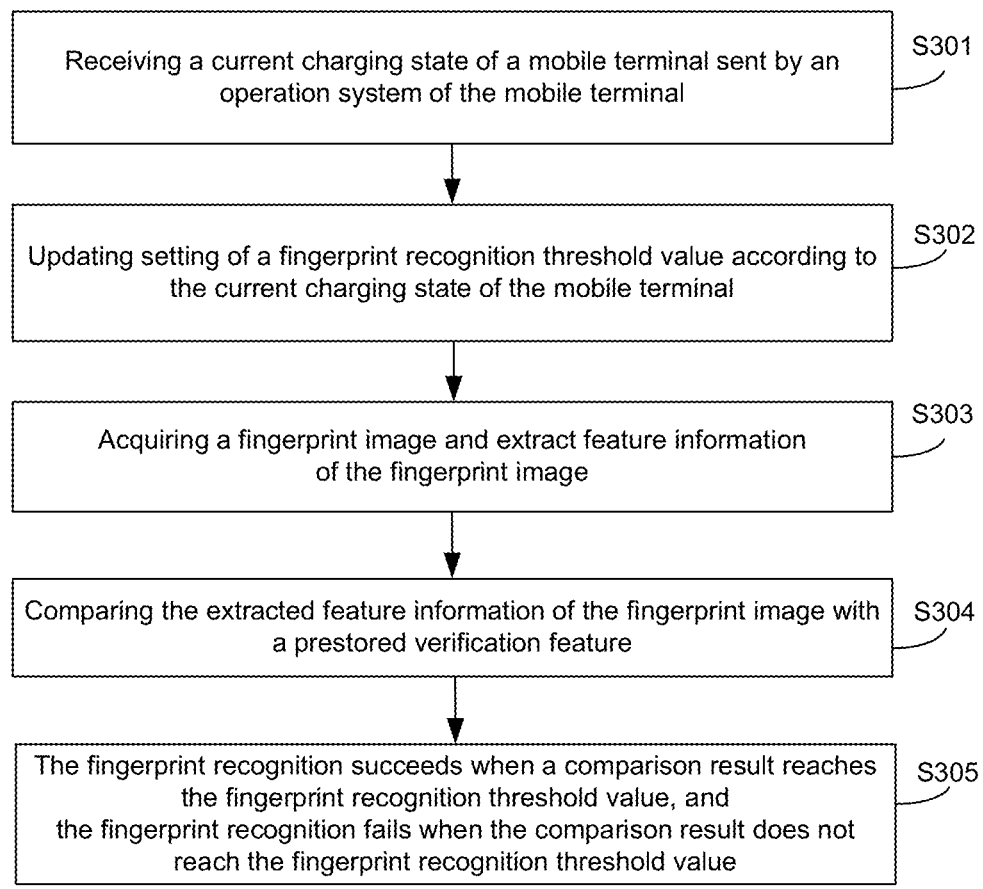
FIG. 3 is a flowchart illustrating another method for fingerprint recognition according to an exemplary embodiment.

FIG. 3 is a flowchart illustrating another method for fingerprint recognition according to an exemplary embodiment. The method may be applied to a mobile terminal including, but not limited to, a mobile phone, a tablet computer (PAD) or the like, such as the apparatus 1000 in FIG. 10. For example, the method may be implemented as an application or a set of instructions stored in the non-transitory storage medium of the mobile terminal. A processor of the mobile terminal may communicate with the storage medium and execute the set of instructions to perform steps in the method. The method may include the following steps S301-S305.

In Step S301, receiving the current charging state of the mobile terminal sent by the mobile terminal system.

In this embodiment, after the mobile terminal is connected to a charger via a data line, the mobile terminal system may send, via a communication channel, a charger signal to the fingerprint recognition IC. The communication channel may be in the form of inter-processor buses such as I²C (Inter-Integrated Circuit), SPI (Serial Peripheral Interface), SDIO (Secure Digital Input Output), and UART (Universal Asynchronous Receiver/Transmitter). Other communication buses may be utilized.

In Step S302, updating the fingerprint recognition threshold value according to the current charging state of the mobile terminal.

To this end, the mobile terminal may obtain a constant value of recognition rate of the fingerprint recognition sensor. This predetermined recognition rate may be predetermined and saved in the mobile terminal. Because sensitivity of the fingerprint recognition sensor changes based on the charging state of the mobile terminal, after the current charging state of the mobile terminal is changed, the sensitivity of the fingerprint recognition sensor is changed. Therefore, after determining and/or obtaining the current charge status, the mobile terminal may update the fingerprint recognition threshold value according to the current charging state, so as to offset and/or counteract the fingerprint recognition rate caused by a drift of the sensitivity. As a result, the mobile terminal may achieve a stable fingerprint recognition rate, i.e., maintaining the fingerprint recognition rate under current charging state the same and/or substantially the same as the previous charging state. The mobile terminal may update the setting of the fingerprint recognition threshold value every time when it receives the charging state of the mobile terminal.

In Step S303, obtaining the fingerprint image, and extracting the feature information of the fingerprint image.

In this embodiment, when a user instructs the mobile terminal to recognize him/her by his/her finger print, the mobile terminal may display the virtual key on the fingerprint recognition area of its touch screen. As the user touches his/her finger on the fingerprint recognition area, the processor of the mobile terminal may direct the fingerprint recognition sensor beneath the area to scan and obtain an current image of the user's fingerprint. The processor of the mobile terminal then may direct the fingerprint recognition IC to obtain and/or receive, the current fingerprint image from the fingerprint recognition sensor, and extract feature information of the current fingerprint image.

In Step S304, comparing the extracted feature information of the fingerprint image with the prestored verification feature.

In an embodiment, the verification feature is stored in the mobile terminal in advance. Before conducting the fingerprint recognition, the user may operate the mobile terminal to scan his/her fingerprint and thereby input a reference fingerprint image into the mobile terminal. The mobile terminal may analyze the image and extract therefrom reference features. Then the mobile terminal may store the reference features as a verification feature.

Later, when the user scan his/her fingerprint to login the mobile terminal or to conduct other operations that needs to verify the user's identity, the mobile terminal may compare the extracted feature information of the current fingerprint image with the prestored verification feature. The mobile terminal may determine that the fingerprint recognition is successful if a comparison result reaches the fingerprint recognition threshold value, while the mobile terminal may determine that the fingerprint recognition is failed if the comparison result does not reach the fingerprint recognition threshold value.

In Step S305, the mobile terminal determines that the fingerprint recognition is successful if the comparison result reaches the fingerprint recognition threshold value, and determines that the fingerprint recognition fails if the comparison result does not reach the fingerprint recognition threshold value.

In the foregoing embodiment, the current charging state of the mobile terminal is acquired from the mobile terminal system, and thus it is facilitated for updating setting of the fingerprint recognition threshold value.

Figure 4:
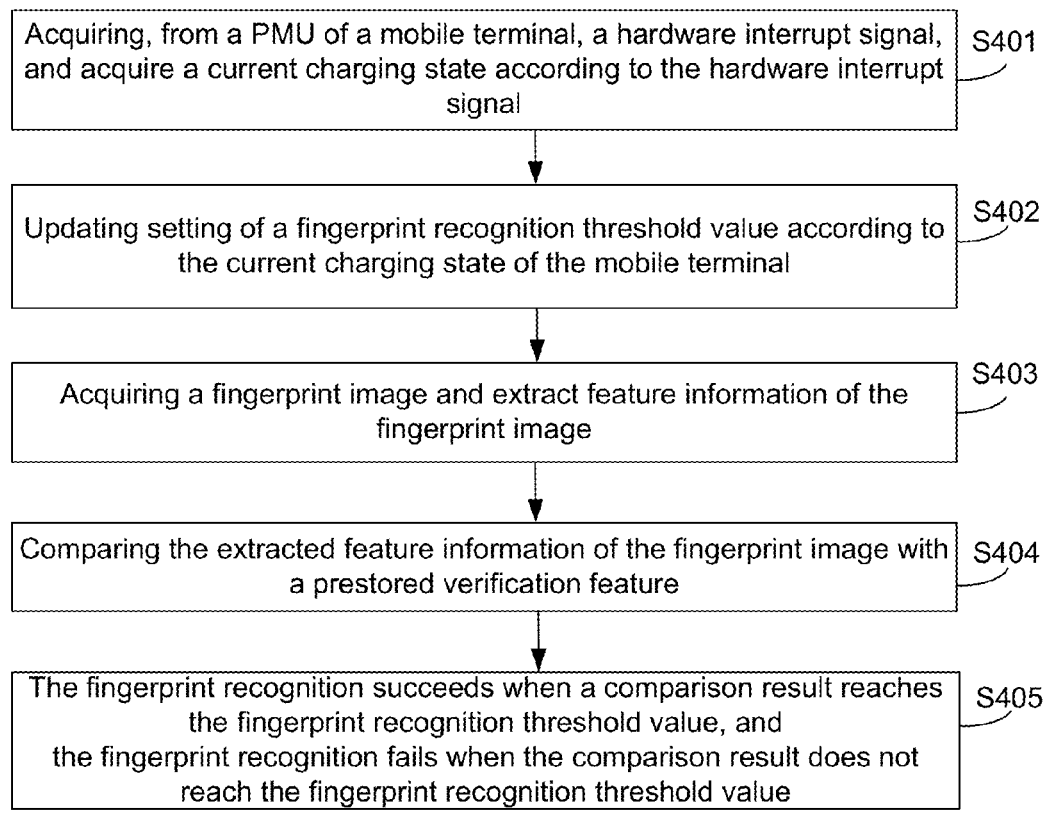
FIG. 4 is a flowchart illustrating a further method for fingerprint recognition according to an exemplary embodiment.

FIG. 4 is a flowchart illustrating a further method for fingerprint recognition according to an exemplary embodiment. The method may be applied to a mobile terminal including, but not limited to, a mobile phone, a tablet computer (PAD) or the like, such as the apparatus 1000 in FIG. 10. For example, the method may be implemented as an application or a set of instructions stored in the non-transitory storage medium of the mobile terminal. A processor of the mobile terminal may communicate with the storage medium and execute the set of instructions to perform steps in the method. The method may include the following steps S401-S405.

In Step S401, receiving a hardware interrupt signal from the PMU of the mobile terminal, and in responding to the hardware interrupt signal, obtaining the current charging state according to the hardware interrupt signal.

In this embodiment, the mobile terminal may be able to determine the difference between connecting to a socket power supply and a power bank or computer battery via a USB port. For example, a charging current from the USB port is different from a current from the socket power supply. The mobile terminal may also receive data signal from the USB port but may receive only charging current from the socket power supply.

After the mobile terminal (for example, a mobile phone) is connected to a computer (or power bank) via a USB data line, the mobile terminal system may acquire and/or obtain a hardware interrupt signal from the PMU, and acquire a USB signal according to the hardware interrupt signal.

In Step S402, updating the fingerprint recognition threshold value according to the current charging state of the mobile terminal.

To this end, the mobile terminal may obtain a constant value of recognition rate of the fingerprint recognition sensor. This predetermined recognition rate may be predetermined and saved in the mobile terminal.

Sensitivity of the fingerprint recognition sensor changes based on the charging state of the mobile terminal. Thus after the current charging state of the mobile terminal is changed, the sensitivity of the fingerprint recognition sensor is changed. Therefore, after determining and/or obtaining the current charge status, the mobile terminal may update the fingerprint recognition threshold value according to the current charging state, so as to offset and/or counteract the fingerprint recognition rate caused by a drift of the sensitivity. As a result, the mobile terminal may achieve a stable fingerprint recognition rate, i.e., maintaining the fingerprint recognition rate under current charging state the same and/or substantially the same as the previous charging state.

The mobile terminal may update the setting of the fingerprint recognition threshold value every time when it receives the charging state of the mobile terminal. Further, the fingerprint recognition threshold value can be updated according to the USB signal or charging current (from the USB port or from the socket power supply).

In Step S403, obtaining a current fingerprint image, and extracting the feature information on the current fingerprint image.

When a user instructs the mobile terminal to recognize him/her by his/her finger print, the mobile terminal may display the virtual key on the fingerprint recognition area of its touch screen. As the user touches his/her finger on the fingerprint recognition area, the processor of the mobile terminal may direct the fingerprint recognition sensor beneath the area to scan and obtain an current image of the user's fingerprint. The processor of the mobile terminal then may direct the fingerprint recognition IC to obtain and/or receive, the current fingerprint image from the fingerprint recognition sensor, and extract feature information of the current fingerprint image.

In Step S404, comparing the extracted feature information on the current fingerprint image with the prestored verification feature.

In an embodiment, the verification feature is stored in the mobile terminal in advance. When the user scans his/her fingerprint to login the mobile terminal or to conduct other operations that needs to verify the user's identity, the mobile terminal may compare the extracted feature information of the current fingerprint image with the prestored verification feature. The mobile terminal may determine that the fingerprint recognition is successful if a comparison result reaches the fingerprint recognition threshold value, while the mobile terminal may determine that the fingerprint recognition is failed if the comparison result does not reach the fingerprint recognition threshold value.

In Step S405, determining that the fingerprint recognition is successful if the comparison result reaches the fingerprint recognition threshold value, and determining that the fingerprint recognition fails if the comparison result does not reach the fingerprint recognition threshold value.

In the foregoing embodiment, the current charging state of the mobile terminal is acquired from the PMU of the mobile terminal, and thus it is facilitated for updating setting of a fingerprint recognition threshold value.

Corresponding to the embodiments of the foregoing method for fingerprint recognition, the present disclosure also provides embodiments of an apparatus for fingerprint recognition.

Figure 5:
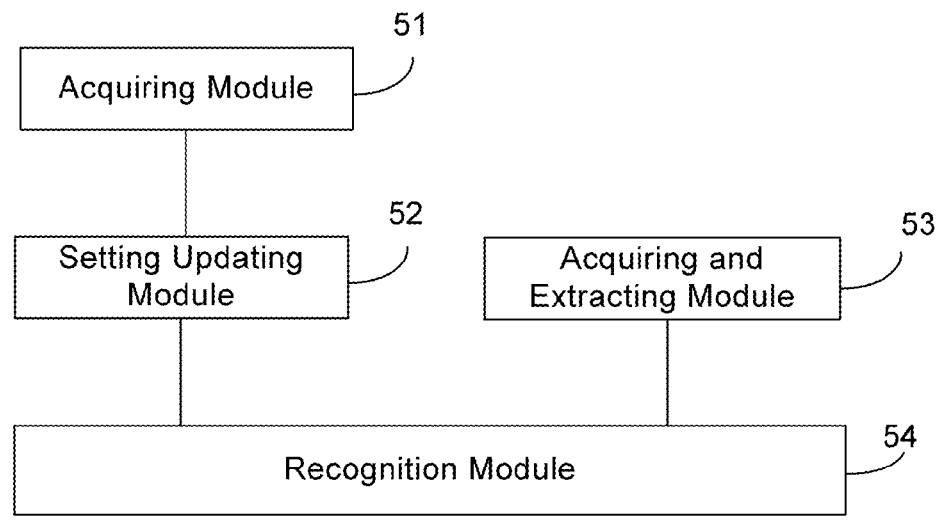
FIG. 5 is a block diagram illustrating an apparatus for fingerprint recognition according to an exemplary embodiment.

FIG. 5 is a block diagram illustrating an apparatus for fingerprint recognition according to an exemplary embodiment. The apparatus may have a physical setting the same as the apparatus 1000 in FIG. 10. Based on function, the apparatus for fingerprint recognition may further include: an acquiring module 51, a setting updating module 52, an acquiring and extracting module 53 and a recognition module 54.

The modules described herein may be implemented in many different ways and as hardware, software or in different combinations of hardware and software. For example, all or parts of the implementations may be a processing circuitry that includes an instruction processor, such as a central processing unit (CPU), microcontroller, a microprocessor; or application specific integrated circuits (ASICs), digital signal processors (DSPs), digital signal processing devices (DSPDs), programmable logic devices (PLDs), field programmable gate arrays (FPGAs), controllers, micro-controllers, microprocessors, other electronic components; or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

The acquiring module 51 is configured to acquire a current charging state of the mobile terminal.

The setting updating module 52 is configured to update setting of a fingerprint recognition threshold value according to the current charging state acquired by the acquiring module 51.

The acquiring and extracting module 53 is configured to acquire a fingerprint image, and extract feature information of the fingerprint image.

The recognition module 54 is configured to conduct fingerprint recognition according to the feature information extracted by the acquiring and extracting module 53. The setting updating module 52 is configured to update the current fingerprint recognition threshold value.

The apparatus in FIG. 5 may implement the method of fingerprint recognition as shown in FIG. 1, which is not described herein.

In the foregoing embodiments of the apparatus for fingerprint recognition, the current charging state of the mobile terminal is acquired by the acquiring module, and setting of the fingerprint recognition threshold value is updated by the setting updating module according to the current charging state of the mobile terminal, such that the mobile terminal can acquire the same fingerprint recognition rate in different charging states.

Figure 6:
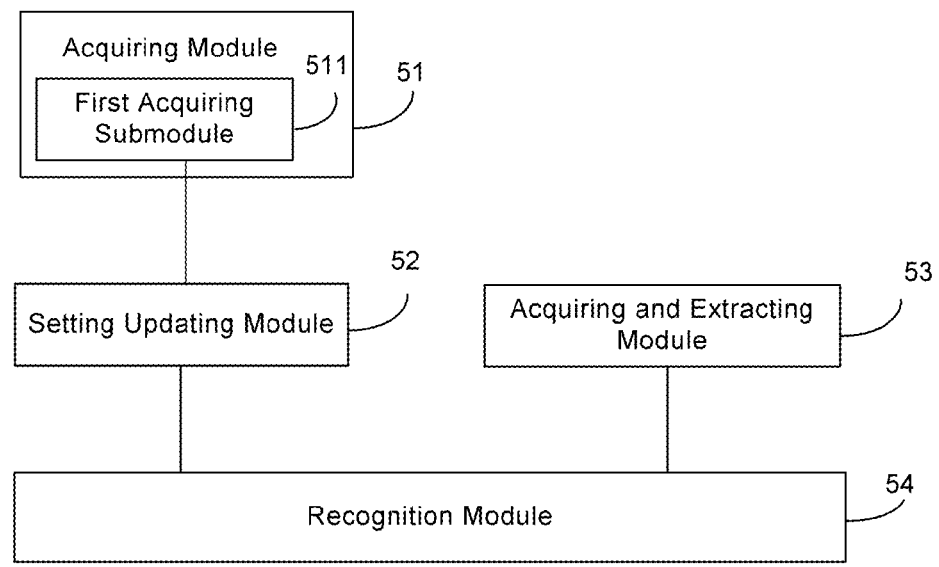
FIG. 6 is a block diagram illustrating another apparatus for fingerprint recognition according to an exemplary embodiment.

FIG. 6 is a block diagram illustrating another apparatus for fingerprint recognition according to an exemplary embodiment. As shown in FIG. 6, on the basis of the embodiment as shown in FIG. 5, the acquiring module 51 may include:

A first acquiring submodule 511 configured to receive the current charging state sent by an operation system of the mobile terminal.

The apparatus in FIG. 6 may adopt and/or implement the method as shown in FIG. 3, which is not described herein.

In the foregoing embodiment, the current charging state of the mobile terminal is acquired from the mobile terminal system, and thus it is facilitated for updating setting of the fingerprint recognition threshold value.

Figure 7:
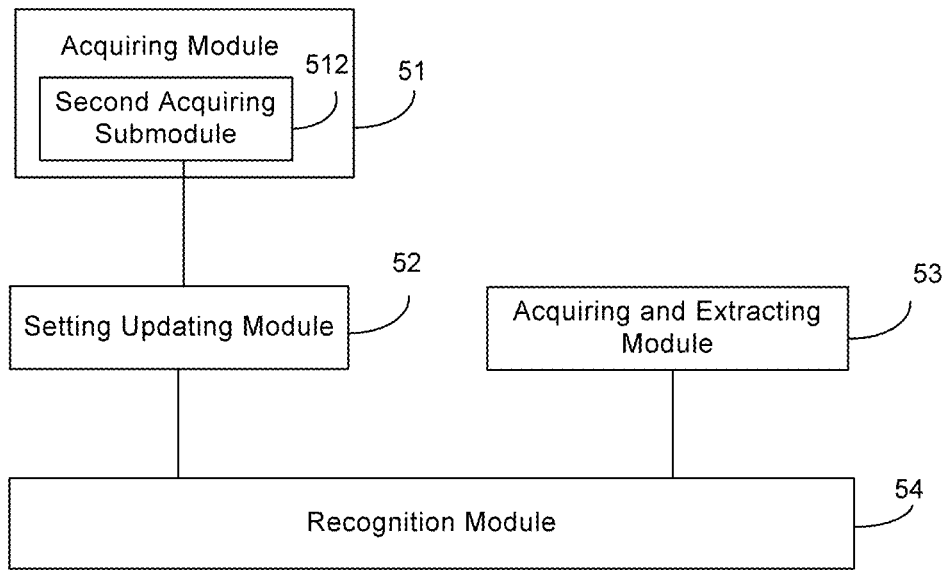
FIG. 7 is a block diagram illustrating another apparatus for fingerprint recognition according to an exemplary embodiment.

FIG. 7 is a block diagram illustrating another apparatus for fingerprint recognition according to an exemplary embodiment. As shown in FIG. 7, on the basis of the embodiment as shown in FIG. 5, the acquiring module 51 may include:

A second acquiring submodule 512 configured to acquire, from a power management unit PMU of the mobile terminal, a hardware interrupt signal, and acquire the current charging state according to the hardware interrupt signal.

The apparatus in FIG. 7 may adopt and/or implement the method as shown in FIG. 4, which is not described herein.

In the foregoing embodiment, the current charging state of the mobile terminal is acquired from the PMU of the mobile terminal, and thus it is facilitated for updating setting of the fingerprint recognition threshold value.

Figure 8:
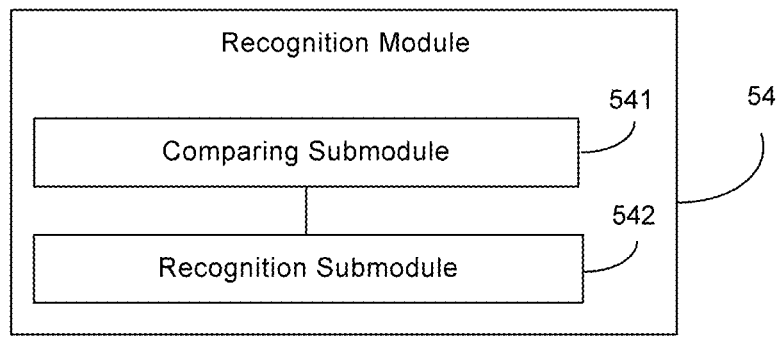
FIG. 8 is a block diagram illustrating a further apparatus for fingerprint recognition according to an exemplary embodiment.

FIG. 8 is a block diagram illustrating a further apparatus for fingerprint recognition according to an exemplary embodiment. As shown in FIG. 8, on the basis of the embodiment as shown in FIG. 5, the recognition module 54 may include: a comparing submodule 541 and a recognition submodule 542.

The comparing submodule 541 is configured to compare the extracted feature information with a prestored verification feature.

The recognition submodule 542 is configured to determine the fingerprint recognition succeeds when a comparison result reaches the fingerprint recognition threshold value, and determine the fingerprint recognition fails when the comparison result does not reach the fingerprint recognition threshold value.

The apparatus in FIG. 8 may adopt and/or implement the methods shown in FIG. 1, FIG. 3 or FIG. 4, which is not described herein.

In the foregoing embodiments, the fingerprint recognition result is determined by comparing the extracted feature information with the prestored verification feature and comparing the comparison result with the current fingerprint recognition threshold value, and the implementation manner is simple.

With regard to the apparatus in the foregoing embodiments, detailed description of specific modes for conducting operation of modules and submodules has been made in the embodiments related to the method, no detailed illustration will be made herein.

Figure 9:
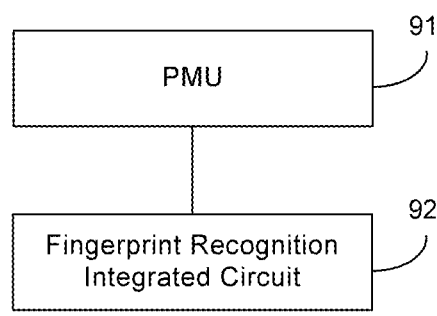
FIG. 9 is a block diagram illustrating a mobile terminal according to an exemplary embodiment.

FIG. 9 is a block diagram illustrating a mobile terminal according to an exemplary embodiment. As shown in FIG. 9, the mobile terminal may include: a PMU 91 and a fingerprint recognition integrated circuit 92.

The PMU 91 is configured to acquire a hardware interrupt signal.

The fingerprint recognition integrated circuit 92 is configured to acquire the hardware interrupt signal from the PMU, acquire the current charging state according to the hardware interrupt signal, and update setting of a fingerprint recognition threshold value according to the current charging state; acquire a current fingerprint image, and extract feature information on the current fingerprint image; and conduct fingerprint recognition according to the feature information and the current fingerprint recognition threshold value.

In an embodiment, the fingerprint recognition integrated circuit 92 may be configured to compare the feature information with the prestored verification feature, and determine the fingerprint recognition to be successful if the comparison result reaches the current fingerprint recognition threshold value, and determine the fingerprint recognition to be failed if the comparison result does not reach the current fingerprint recognition threshold value.

The apparatus in FIG. 9 may adopt and/or implement the method shown in FIG. 4, which is not described herein.

In the foregoing embodiments, the current charging state of the mobile terminal is acquired from the PMU of the mobile terminal, and setting of the fingerprint recognition threshold value is updated according to the current charging state of the mobile terminal, such that the mobile terminal can achieve the same fingerprint recognition rate in different charging states.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An electronic device, comprising:
    a sensor configured to scan an image from an image recognition area; and
    a processor in communication with the sensor, the processor configured to:
        determine a current charging state of the electronic device;
        determine a current image recognition threshold value according to the current charging state;
        obtain a target image from the sensor;
        extract feature information associated with the target image; and
        perform image recognition according to the feature information and the current image recognition threshold value.

2. The electronic device of claim 1, wherein the target image comprises a fingerprint of a user.

3. The electronic device of claim 1, wherein the current charging state of the electronic device comprises one of charging via a USB port, charging via a socket power supply, and not being charged.

4. The electronic device of claim 1, wherein a sensitivity of the sensor varies according to the current charging state; and
    the processor is configured to determine the current image recognition threshold value to offset a change of a sensitivity of the sensor so that an image recognition rate of the sensor remains substantially equal to a predetermined value.

5. The electronic device of claim 1, wherein to obtain the target image, the processor is further configured to:
    receive an instruction from a user to obtain the image; and
    in response to the instruction,
        activate the sensor to scan an image from the image recognition area; and
        receive the image as the target image.

6. The electronic device of claim 5, wherein the image recognition area is an area in a screen of the electronic device; and
    the processor is further configured to display a virtual key on the screen that identifies the image recognition area.

7. The electronic device of claim 1, wherein to obtain the current charging state the processor is further configured to:
    receive, from a power management unit (PMU) of the electronic device, a hardware interrupt signal; and
    in response to the hardware interrupt signal, determine the current charging state based on the hardware interrupt signal.

8. The electronic device of claim 1, wherein to perform the image recognition the processor is further configured to:
    determine a similarity of the feature information to a prestored verification feature;
    determine that the image recognition succeeds when the similarity is greater than the image recognition threshold value; and
    determine that the image recognition fails when the similarity is less than the image recognition threshold value.

9. A method for fingerprint recognition, comprising:
- determining, by a mobile terminal, a current charging state of the mobile terminal;
- determining, by the mobile terminal, a current image recognition threshold value based on the current charging state;
- obtaining, by the mobile terminal, a target image from a sensor of the mobile terminal;
- extracting, by the mobile terminal, feature information associated with the target image; and
- performing, by the mobile terminal, image recognition according to the feature information and the current image recognition threshold value.

10. The method of claim 9, wherein the target image comprises a fingerprint of a user.

11. The method of claim 9, wherein the current charging state of the mobile terminal comprises one of charging via a USB port, charging via a socket power supply, and not being charged.

12. The method of claim 9, wherein sensitivity of the sensor varies according to a charging state of the mobile terminal; and
- the current image recognition threshold value is determined to offset change of the sensitivity so that an image recognition rate of the sensor remains substantially equal to a predetermined value.

13. The method of claim 9, wherein the obtaining of the target image comprises:
- receiving an instruction from a user to obtain the image;
- in response to the instruction,
  - activating the sensor to scan an image from an image recognition area; and
  - receiving the image as the target image.

14. The method of claim 13, wherein the image recognition area is an area in a screen of the mobile terminal; and
- the method further comprising displaying, by the mobile terminal, a virtual key on the screen that identifies the image recognition area.

15. The method of claim 9, wherein the obtaining of the current charging state of a mobile terminal comprises:
- receiving, from a power management unit PMU of the mobile terminal, a hardware interrupt signal; and
- in response to the hardware interrupt signal, obtaining the current charging state according to the hardware interrupt signal.

16. The method of claim 9, wherein performing the image recognition comprises:
- determining a similarity of the feature information with a prestored verification feature;
- determining that the image recognition succeeds when the similarity is greater than the image recognition threshold value; and
- determining that the image recognition fails when the similarity is less than the image recognition threshold value.

17. A mobile phone, comprising
- a power management unit (PMU) configured to obtain a hardware interrupt signal; and
- an image recognition integrated circuit configured to:
  - obtain the hardware interrupt signal from the PMU;
  - determine a current charging state of the mobile phone based on the hardware interrupt signal;
  - determine a fingerprint recognition threshold value according to the current charging state;
  - obtain a fingerprint image from a sensor of the mobile phone;
  - extract feature information of the fingerprint image; and
  - perform fingerprint recognition according to the feature information and the fingerprint recognition threshold value.

18. The mobile phone of claim 17, wherein the current charging state of the mobile phone comprises one of charging via a USB port, charging via a socket power supply, and not being charged.

19. The mobile phone of claim 17, wherein sensitivity of the sensor varies according to a charging state of the mobile phone; and
- the image recognition integrated circuit is configured to determine the fingerprint recognition threshold value to offset change of the sensitivity so that a fingerprint recognition rate of the sensor remains substantially equal to a predetermined value.

20. The mobile phone of claim 17, wherein the image recognition integrated circuit is further configured to:
- compare the feature information with a prestored verification feature;
- determine that the fingerprint recognition succeeds when a comparison result reaches the fingerprint recognition threshold value; and
- determine that the fingerprint recognition fails when the comparison result does not reach the fingerprint recognition threshold value.

* * * * *